US012613763B2

(12) United States Patent
Prakash et al.

(10) Patent No.: US 12,613,763 B2
(45) Date of Patent: Apr. 28, 2026

(54) CLASSIFYING AN AREA AS HAZARDOUS OR NON-HAZARDOUS BASED ON AN OPERATION OF A SEMICONDUCTOR DEVICE

(71) Applicant: Micron Technology, Inc., Boise, ID (US)

(72) Inventors: Pavana Prakash, Houston, TX (US); Shashank Bangalore Lakshman, Folsom, CA (US); Febin Sunny, Folsom, CA (US); Saideep Tiku, Fort Collins, CO (US); Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 16 days.

(21) Appl. No.: 18/405,793

(22) Filed: Jan. 5, 2024

(65) Prior Publication Data

US 2024/0231993 A1 Jul. 11, 2024

Related U.S. Application Data

(60) Provisional application No. 63/437,831, filed on Jan. 9, 2023.

(51) Int. Cl.
*G06F 11/07* (2006.01)
(52) U.S. Cl.
CPC ........ *G06F 11/079* (2013.01); *G06F 11/0709* (2013.01)

(58) Field of Classification Search
CPC ........................... G06F 11/079; G06F 11/0709
See application file for complete search history.

(56) References Cited

U.S. PATENT DOCUMENTS

| | | | |
|---|---|---|---|
| 11,238,943 B1 * | 2/2022 | Ray .................... | G11C 16/0408 |
| 2021/0133589 A1 * | 5/2021 | Banerjee ................ | G06N 3/045 |

OTHER PUBLICATIONS

Prakash, et al, U.S. Appl. No. 18/535,926, filed Dec. 11, 2023.
Prakash, et al, U.S. Appl. No. 18/393,357, filed Dec. 21, 2023.

* cited by examiner

*Primary Examiner* — Bryce P Bonzo
*Assistant Examiner* — Audrey Emma Whitesell
(74) *Attorney, Agent, or Firm* — Brooks, Cameron & Huebsch, PLLC

(57) ABSTRACT

The present disclosure includes apparatuses, methods, and systems for classifying an area as hazardous or non-hazardous based on an operation of a semiconductor device. In an example, an apparatus can include a memory configured to store a global operation model and a processor coupled to the memory wherein the processor is configured to receive test data and operating data from a semiconductor device based on operation of the semiconductor device in an area, run the global operation model on the test data and the operating data from the semiconductor device to generate output data, and classify the area as hazardous or non-hazardous based on the output data.

13 Claims, 5 Drawing Sheets

440

TRANSMITTING A GOLDEN MODEL TO A MEMORY DEVICE IN AN AREA FROM A CENTRAL SERVER — 442

RECEIVING TEST DATA AND OPERATING DATA AT THE CENTRAL SERVER FROM THE MEMORY DEVICE — 444

RUNNING A GLOBAL OPERATION MODEL ON THE TEST DATA AND THE OPERATING DATA TO GENERATE OUTPUT DATA — 446

CLASSIFYING THE AREA AS HAZARDOUS OR NON-HAZARDOUS BASED ON THE OUTPUT DATA — 448

440

TRANSMITTING A GOLDEN MODEL TO A MEMORY DEVICE IN AN AREA FROM A CENTRAL SERVER — 442

RECEIVING TEST DATA AND OPERATING DATA AT THE CENTRAL SERVER FROM THE MEMORY DEVICE — 444

RUNNING A GLOBAL OPERATION MODEL ON THE TEST DATA AND THE OPERATING DATA TO GENERATE OUTPUT DATA — 446

CLASSIFYING THE AREA AS HAZARDOUS OR NON-HAZARDOUS BASED ON THE OUTPUT DATA — 448

CLASSIFYING AN AREA AS HAZARDOUS OR NON-HAZARDOUS BASED ON AN OPERATION OF A SEMICONDUCTOR DEVICE

PRIORITY INFORMATION

This application claims the benefit of U.S. Provisional Application No. 63/437,831, filed on Jan. 9, 2023, the contents of which are incorporated herein by reference.

TECHNICAL FIELD

The present disclosure relates generally to apparatuses, methods, and systems for classifying an area as hazardous or non-hazardous based on an operation of a semiconductor device.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), static random access memory (SRAM), and synchronous dynamic random access memory (SDRAM), among others. Non-volatile memory can provide persistent data by retaining stored data when not powered and can include NAND flash memory, NOR flash memory, read only memory (ROM), and resistance variable memory such as phase change random access memory (PCRAM), resistive random access memory (RRAM), and magnetic random access memory (MRAM), among others.

Memory devices can be combined together to form a solid state drive (SSD), an embedded MultiMediaCard (e.MMC), and/or a universal flash storage (UFS) device. An SSD, e.MMC, and/or UFS device can include non-volatile memory (e.g., NAND flash memory and/or NOR flash memory), and/or can include volatile memory (e.g., DRAM and/or SDRAM), among various other types of non-volatile and volatile memory.

DETAILED DESCRIPTION

Figure 1:
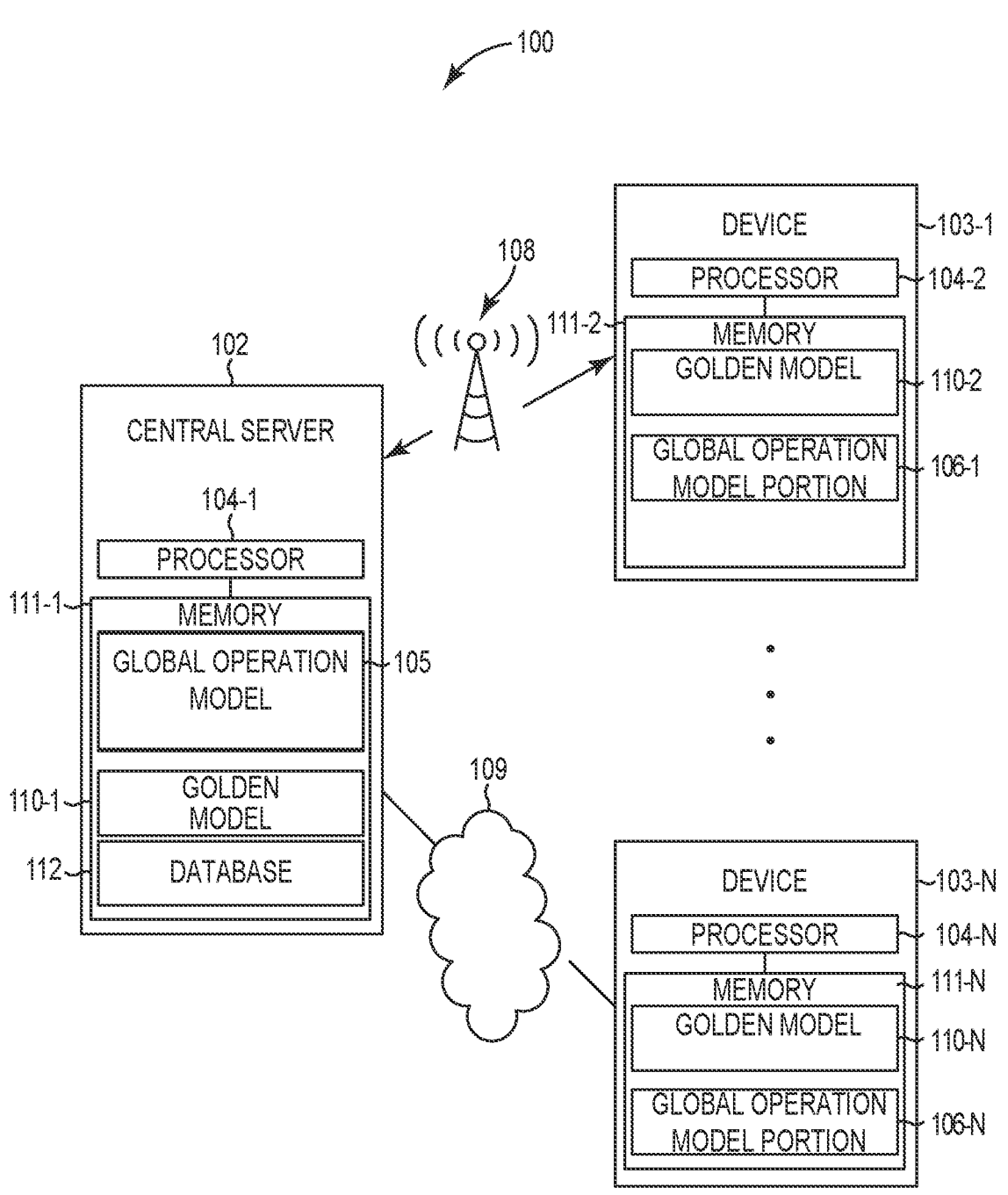
FIG. 1 illustrates an example computing system for training a global operation model in accordance with some embodiments of the present disclosure.

The present disclosure includes apparatuses, methods, and systems for classifying an area as hazardous or non-hazardous based on an operation of a semiconductor device. In an example, an apparatus can include a memory configured to store a global operation model and a processor coupled to the memory wherein the processor is configured to receive test data and operating data from a semiconductor device based on operation of the semiconductor device in an area, run the global operation model on the test data and the operating data from the semiconductor device to generate output data, and classify the area as hazardous or non-hazardous based on the output data.

The test data can be a golden model accuracy and/or a golden model deviation from an expected golden model accuracy from running a golden model on the semiconductor device in the area. The operating data can be a cell current, a threshold voltage, and/or an operating temperature of the semiconductor in the area while running the golden model. The output data can include an ambient temperature and/or a particle saturation at the semiconductor device and/or in the area.

Sensors can be used in anomaly detection for critical applications. For example, sensors can continuously monitor for alpha particles and/or temperature changes in aerospace environments or environments near nuclear reactors. These sensors can be custom built and expensive.

Aspects of the present disclosure address the above and other deficiencies by using a semiconductor device to infer a safety critical nature of an environment without these sensors. Characteristics of a semiconductor device can be recorded while running a particular application. This application can be a golden model, for example. A golden model can have a known output for certain inputs. In a number of embodiments, the output can be an accuracy and/or a deviation in the accuracy.

The output from the golden model can be run in a global operation model, which can be an artificial neural network (ANN). The environment of the semiconductor device can be deemed hazardous or non-hazardous based on the output of the global operation model.

In some examples, the global operation model can be built through federated learning. Federated learning describes the training of an algorithm using multiple decentralized semiconductor devices. In various examples, each of the semiconductor devices can receive a different portion of the global operation model. The semiconductor devices can also receive the golden model from a central server. The golden model and the different portions of the global operation model can be utilized by the semiconductor devices to train the global operation model. The different portions of the global operation model can each be a local model that are specific to each semiconductor device. While the global operation model can be an aggregation of what is learned on each semiconductor device, creating a more generic global operation model at the server than the different portions of the global operation model on the semiconductor devices.

As used herein, "a", "an", or "a number of" can refer to one or more of something, and "a plurality of" can refer to two or more such things. For example, a number of portions of a global operation model can refer to one or more portions, and a plurality of portions of a global operation model can refer to two or more portions. Additionally, designators such as "N", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 105 may reference element "05" in FIG. 1, and a similar element may be referenced as 205 in FIG. 2.

FIG. 1 illustrates an example computing system 100 for training a global operation model 105 in accordance with some embodiments of the present disclosure. In some examples, the global operation model can be an ANN model. The computing system 100 can comprise a central server 102 and semiconductor devices 103-1, 103-N (e.g., devices 103-1, 103-N), referred to herein as semiconductor devices 103. The semiconductor devices 103 can be, but are not limited to, memory on a memory device, a wearable device, a desktop, a laptop, a tablet, and/or a mobile device.

The computing system 100, the central server 102, and the semiconductor devices 103 can comprise hardware, firmware, and/or software configured to train the global operation model 105. As used herein, the global operation model 105 can include a plurality of weights, biases, and/or activation functions among other variables that can be used to execute an ANN. The central server 102 and the semiconductor devices 103 can further include memory sub-systems 111-1, 111-2, 111-N (e.g., a non-transitory MRM), referred to herein as memory sub-system 111, on which may be stored the global operation model 105, a portion of the global operation model 106-1, 106-N, referred to herein as portions 106, a golden model 110-1, 110-2, 110-N, referred to herein as golden model 110, and/or data (e.g., sensor data, test data, and/or operating data).

The memory sub-systems 111 may comprise memory. The memory may be electronic, magnetic, optical, or other physical storage that stores executable instructions. The memory may be, for example, non-volatile or volatile memory. In some examples, memory can be a non-transitory MRM comprising RAM, an Electrically-Erasable Programmable ROM (EEPROM), a storage drive, an optical disc, and the like.

The memory sub-systems 111 may be disposed within a controller, the central server 102, and/or the semiconductor devices 103. In this example, the golden model 110 can be "installed" on the central server 102. The memory sub-systems 111 can be portable, external or remote storage mediums, for example, that allow the central server 102 and/or the semiconductor devices 103 to download the golden model 110 from the portable/external/remote storage mediums. In this situation, the golden model 110 may be part of an "installation package." As described herein, the memory sub-systems 111 can be encoded with executable instructions and/or the golden model 110 for training the global operation model 105.

The central server 102 can provide the golden model 110 and/or the global operation model 105 to the semiconductor devices 103. For example, the central server 102 can divide the global operation model 105 into multiple portions 106-1, 106-N. Each of the portions 106 of the global operation model 105 can correspond to a layer of the global operation model 105 or multiple layers of the global operation model 105. For example, the central server 102 can provide an input layer of the global operation model 105 to the semiconductor device 103-1 and an output layer of the global operation model 105 to the semiconductor device 103-N. The central server 102 can provide the portions 106 of the global operation model 105 and/or the golden model 110 to the semiconductor devices 103 utilizing a wireless network 108 and/or a physical network 109.

The semiconductor devices 103 can store the portions 106 and/or the golden model 110. The semiconductor devices 103, comprising the processors 104-2, 104-N, can execute the portions 106 of the global operation model 105 utilizing the processors 104-2, 104-N to generate output data. Although not shown, the output data can be stored in the memory sub-systems 111-2, 111-N of the semiconductor devices 103. The output data can be provided to the central server 102. The central server 102 can provide the output data to different semiconductor devices from the semiconductor devices 103 for further processing.

The central server 102 can utilize the output data to generate corrections (e.g., training feedback) for the global operation model 105. The corrections can be used to modify the weights, biases, and/or activation functions of the global operation model 105. The corrections can be provided to the semiconductor devices 103. The semiconductor devices 103 can affect the corrections to update the global operation model 105 to be a trained model. As used herein, the trained global operation model 105 can describe an ANN model that has been trained using golden model 110. Each of the semiconductor devices 103 can update a corresponding portion 106 of the global operation model 105 to be trained. The semiconductor devices 103 can provide the trained global operation model 105 to the central server 102. The central server 102 can utilize the trained global operation model 105 and/or can provide the trained global operation model 105 to a different computing device to utilize the trained global operation model 105.

The central server 102 can transmit the golden model 110 to the semiconductor devices 103 to execute the golden model 110, using the processors 104-2, 104-N, and use the outputs from the golden model 110 to train the global operation model 105. The golden model 110 can be software, encoded in a computer readable-medium, and/or logic to train the global operation model 105.

For example, the central server 102 can cause the global operation model 105 to be divided into the portions 106 and to be provided to the semiconductor devices 103. The central server 102 can provide the portion 106-1 of the global operation model 105 to the semiconductor device 103-1 and the portion 106-N of the global operation model 105 to the semiconductor device 103-N. Each semiconductor device of the semiconductor devices 103 can receive a different portion 106 of the global operation model 105. In various instances, some of the semiconductor devices 103 can receive a same portion 106 of the global operation model 105. For instance, a first semiconductor device can receive a first portion while a second semiconductor device and a third semiconductor device can receive a second portion.

The semiconductor devices 103 can provide output data generated using the portions 106 of the global operation model 105 to process previously received output data or output data generated from running the golden model 110. For instance, the semiconductor device 103-1 can process test data and/or operating data using the portion 106-1 of the global operation model 105 to generate output data. The semiconductor device 103-1 can provide the output data to the central server 102.

In various instances, the central server 102 can provide instructions to the semiconductor devices 103 to cause the semiconductor devices 103 to provide their output data to different semiconductor devices 103 directly without first providing their output data to the central server 102. In this case, the central server 102 provides a golden model and receives output data from the semiconductor devices 103. The output data can be stored in a database 112 of the central server 102, for example.

In various examples, the processors 104 can be internal to the memory sub-systems 111 instead of being external to the memory sub-systems 111 as shown. For instance, the processors 104 can be processor in memory (PIM) processors. The processors 104 can be incorporated into the sensing circuitry of the memory sub-systems 111 and/or can be implemented in the periphery of the memory sub-system 111, for instance. The processors 104 can be implemented under one or more memory arrays of the memory sub-system 111.

Figure 2:
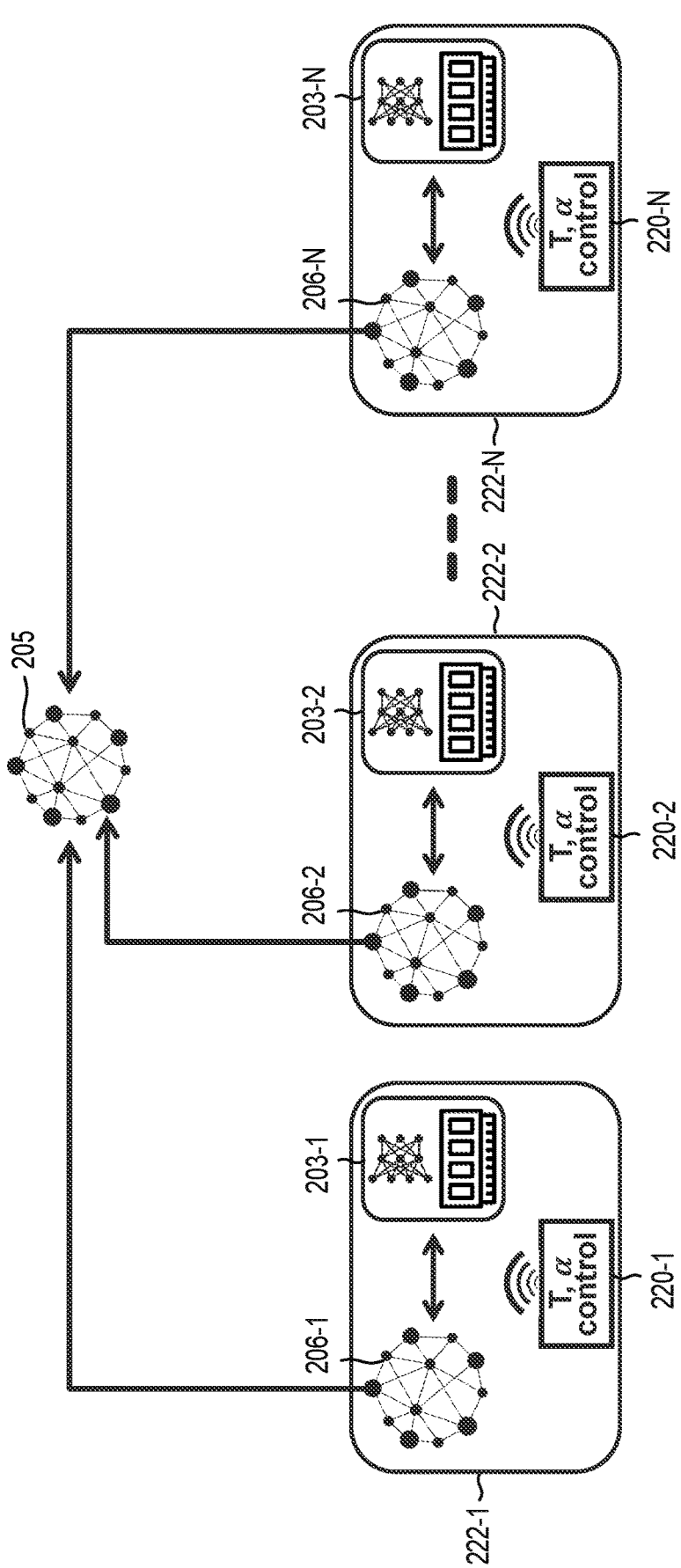
FIG. 2 illustrates a block diagram for training a global operation model in accordance with some embodiments of the present disclosure.

FIG. 2 illustrates a block diagram for training a global operation model 205 in accordance with some embodiments of the present disclosure. A first semiconductor device 203-1 and a first sensor 220-1 can be located in a first area 222-1, a second semiconductor device 203-2 and a second sensor 220-2 can be located in a second area 222-2, and a third semiconductor device 203-N and a third sensor 220-N can be located in a third area 222-N.

A first portion 206-1 of the global operation model 205 can be provided to the first semiconductor device 203-1, a second portion 206-2 of the global operation model 205 can be provided to the second semiconductor device 203-2, and a third portion 206-N of the global operation model 205 can be provided to the third semiconductor device 203-N. In various instances, a portion of the global operation model 205 can include a layer of the global operation model 205. For instance, an input layer of the global operation model 205 can comprise a first portion of the global operation model 205. The input layer of the global operation model 205 can comprise multiple nodes and corresponding weights, biases, and/or activation functions. In various instances, each portion 206 can comprise a single layer or can be a separate layer of the global operation model 205. In a number of embodiments, portion 206-N of the global operation model 205 can comprise an output layer.

Each of the semiconductor devices 203 can receive and run a golden model (e.g., golden model 110 in FIG. 1). The golden model can be a fixed workload. Sensor data can be recorded via each of the corresponding sensors 220 in each area 222 while running the golden model. Test data and operating data can also be collected while running the golden model. Each portion 206 of the global operation model 205 can be trained using the sensor data, test data, and operating data collected at each area 222 to train the global operation model 205 by federated learning. For example, the first portion 206-1 of the global operation model 205 can be trained using the sensor data from the first sensor 220-1 and the test data and/or the operating data from the first semiconductor device 203-1, the second portion 206-2 of the global operation model 205 can be trained using the sensor data from the second sensor 220-2 and the test data and/or the operating data from the second semiconductor device 203-2, and the third portion 206-N of the global operation model 205 can be trained using the sensor data from the third sensor 220-N and the test data and/or the operating data from the third semiconductor device 203-N.

Each of the areas 222 can be a known hazardous area or a known non-hazardous area. An area could be deemed hazardous if the area threatens the health of a person and/or an animal and/or the form and/or function of property. For example, a hazardous area could be an area above an ambient temperature threshold, particle saturation threshold, and/or radiation level threshold. Areas 222 with sensors 220 recording values above any of these thresholds can be classified as hazardous areas.

In a number of embodiments, semiconductor devices 203 in known hazardous areas 222 can provide an incorrect answer when using the golden model. A magnitude of error of the incorrect answer can be compared to data collected from a sensor 220 on or in the same area 222 as the semiconductor device 203 to learn a correlation between the error and the hazardousness of the area 222. In order for the correlation to be accurate, semiconductor devices 203 cannot be shielded from an environment of the area 222. For example, the semiconductor device 203 and/or the sensor 220 cannot be within an enclosure that prevents the semiconductor device 203 and/or the sensor 220 from being exposed to the temperature, particles, and/or radiation in the area 222.

The global operation model 205 can be trained to identify test data and operating data similar to the test data and operating data from semiconductor devices 203 belonging to known hazardous areas and classify their corresponding areas as hazardous. For example, semiconductor devices 203 that provide an output outside of a golden model accuracy and/or outside of a golden model deviation from an expected golden model accuracy can be in hazardous areas. Similarly, the global operation model 205 can be trained to identify test data and operating data similar to the test data and operating data from semiconductor devices 203 belonging to known non-hazardous areas and classifying their corresponding areas as non-hazardous. For example, semiconductor devices 203 that provide an output with a golden model accuracy and/or within a golden model deviation from an expected golden model accuracy can be in non-hazardous areas.

In various examples, the semiconductor devices 203 can be grouped based on characteristics of the semiconductor devices 203 which can be beneficial for the training of the global operation model 205. Semiconductor devices 203 in the same group can be used to train the same portion 206 of the global operation model 205 to increase the accuracy of that portion 206 of the global operation model 205. For example, semiconductor devices 203 in known hazardous areas can be grouped together and semiconductor devices 203 in known non-hazardous areas can be grouped together. In a number of embodiments, the groupings can be based on the type of semiconductor device 203 and/or the type of hazardous area 222.

Figure 3:
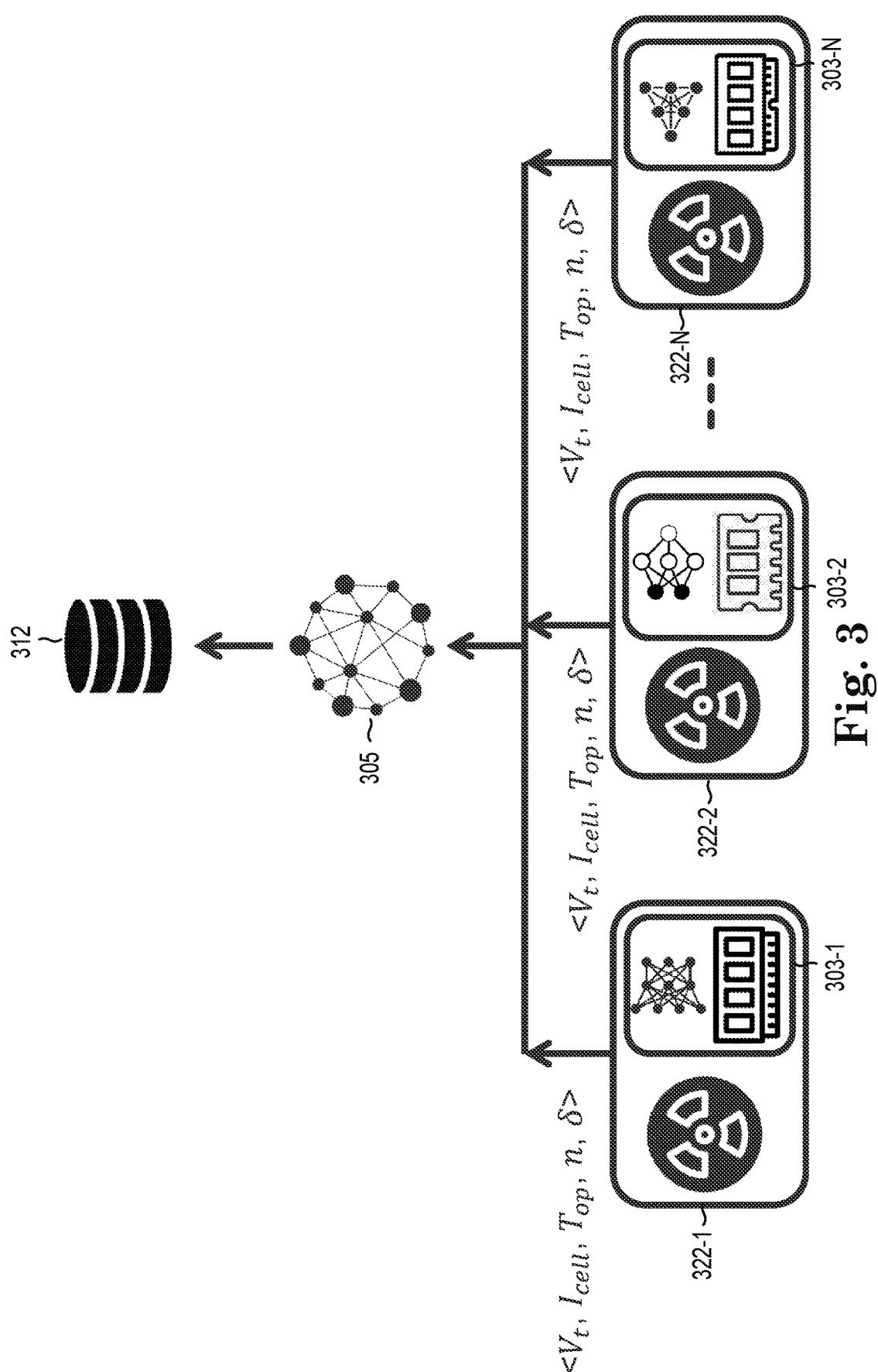
FIG. 3 illustrates a block diagram for classifying an area as hazardous or non-hazardous in accordance with some embodiments of the present disclosure.

FIG. 3 illustrates a block diagram for classifying an area as hazardous or non-hazardous in accordance with some embodiments of the present disclosure. A first semiconductor device 303-1 can be in a first area 322-1, a second semiconductor device 303-2 can be in a second area 322-2, and a third semiconductor device 303-N can be in a third area 322-N. Each of the semiconductor devices 303 can store and/or execute a golden model (e.g., golden model 110 in FIG. 1) and/or a global operation model 305.

Executing the golden model can include performing a fixed workload. Each of the semiconductor devices 303 can record a number of errors occurring while performing the fixed workload and determine a golden model accuracy and/or a golden model deviation from an expected golden model accuracy based on the number of errors occurring while performing the fixed workload. The operating data including a threshold voltage, a cell current, and/or an operating temperature of each of the semiconductor devices 303 can also be recorded during the fixed workload.

The global operation model 305 can be run on the golden model accuracy and/or the golden model deviation from the expected golden model accuracy from each of the semiconductor devices 303. In a number of embodiments, the global operation model 305 can be run on the operating data instead of or in conjunction with the test data from each of the semiconductor devices 303. An output of the global operation model 305 can be an ambient temperature and/or a particle saturation at a semiconductor device location (e.g., area 322). Each area 322 can be classified as hazardous or non-hazardous based on an output of the global operation model 305.

For example, semiconductor device 303-1 can execute a golden model by performing a fixed workload. A number of errors occurring while performing the fixed workload can be recorded by the semiconductor device 303-1. The semiconductor device 303-1 can determine test data including a golden model accuracy and/or a golden model deviation by comparing the number of errors to an expected golden model accuracy. The global operation model 305 can compare the golden model accuracy and/or the golden model deviation of the semiconductor device 303-1 to other golden model accuracies and/or other golden model deviations and provide a corresponding output of a match from the other golden model accuracies and/or other golden model deviations. The output can be a classification of the area 322-1 as hazardous or non-hazardous or can be data that can be used to classify the area 322-1 as hazardous or non-hazardous.

The classification of each area 322 can be stored in a database 312. In a number of embodiments, the database 312 can be stored in a central server (e.g., central server 102 in FIG. 1). For example, a message can be transmitted to the central server in response to classifying an area as hazardous or non-hazardous. The message can include an identifier, a classification, test data, operating data, and/or sensor data of an area.

Figure 4:
FIG. 4 is a flow diagram corresponding to a method for classifying an area as hazardous or non-hazardous in accordance with some embodiments of the present disclosure.
Figure 4:
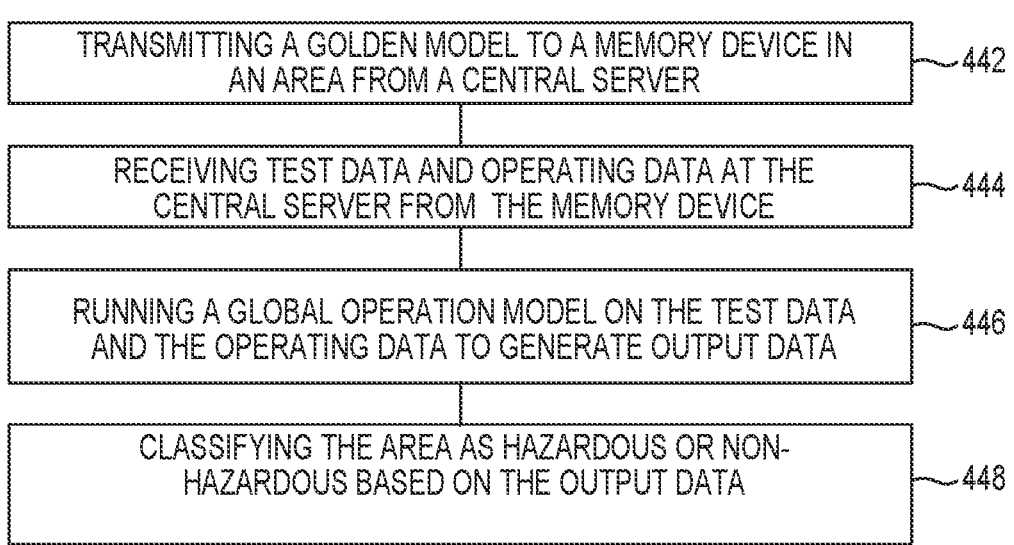

FIG. 4 is a flow diagram corresponding to a method 440 for classifying an area as hazardous or non-hazardous in accordance with some embodiments of the present disclosure. The method 440 may be performed, in some examples, using a computing system such as those described with respect to FIG. 1.

At 442, the method 440 can include transmitting a golden model (e.g., golden model 110 in FIG. 1) to a memory device in an area (e.g., area 322 in FIG. 3) from a central server (e.g., central server 102 in FIG. 1). The central server can transmit the golden model prior to receiving test data and/or operating data.

In some examples, the global operation model can be transmitted from the central server to the memory device in response to training the global operation model. The global operation model can be trained at the central server using test data and operating data collected while performing a fixed workload at a different memory device. The global operation model can also be trained using sensor data recorded while performing the fixed workload at the different memory device. The sensor data at the different memory device can be recorded using an alpha particle sensor and/or a temperature sensor, for example.

The method 440 can include receiving test data and operating data at the central server from the memory device at 444. In a number of embodiments, the method 440 can further include the central server requesting the test data and operating data from the memory device prior to receiving the test data and operating data. The test data can be a golden model accuracy and/or a golden model deviation from an expected golden model accuracy. The operating data can be a cell current, a threshold voltage, and/or an operating temperature of the memory device. The test data and the operating data can be based on an operation of the memory device in the area.

At 446, the method 440 can include running a global operation model (e.g., global operation model 305 in FIG. 3) on the test data and the operating data to generate output data. The global operation model can compare the test data and the operating data to other test data and other operating data from different memory devices and provide a corresponding output of a match from the other test data and/or other operating data. The output can be a classification of the area as hazardous or non-hazardous or can be data that can be used to classify the area as hazardous or non-hazardous.

Examples of the output data include an ambient temperature and/or a particle saturation at the memory device and/or in the area. The output data can be derived without needing a sensor at the memory device and/or in the area.

The method 440 can include classifying the area as hazardous or non-hazardous based on the output data at 448. For example, if the output data includes a radiation level. The area can be classified as hazardous if at or above a threshold radiation level and classified as non-hazardous if below the threshold radiation level.

Figure 5:
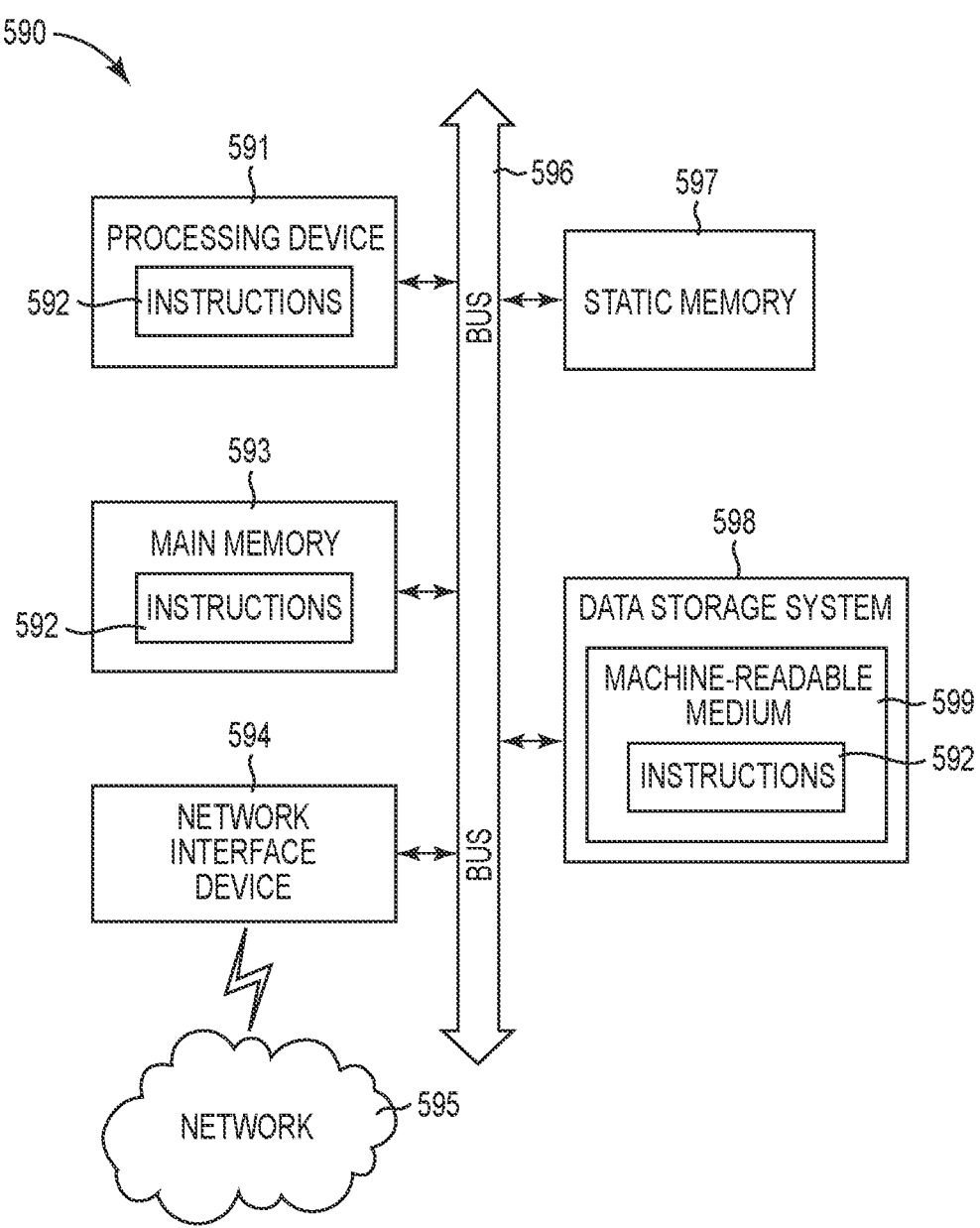
FIG. 5 is a block diagram of an example computer system in which embodiments of the present disclosure may operate.

FIG. 5 is a block diagram of an example computer system 590 in which embodiments of the present disclosure may operate. For example, FIG. 5 illustrates an example machine of a computer system 590 within which a set of instructions, for causing the machine to perform any one or more of the methodologies discussed herein, can be executed. In some embodiments, the computer system 590 can correspond to a host system that includes, is coupled to, or utilizes a memory sub-system (e.g., the memory sub-systems 111-1, 111-2, 111-N of FIG. 1). The computer system 590 can be used to perform the operations described herein (e.g., to perform operations corresponding to the processors 104-1, 104-2, 104-N of FIG. 1). In alternative embodiments, the machine can be connected (e.g., networked) to other machines in a LAN, an intranet, an extranet, the Internet, and/or wireless network. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 590 includes a processing device (e.g., processor) 591, a main memory 593 (e.g., read-only memory (ROM), flash memory, dynamic random access memory (DRAM) such as synchronous DRAM (SDRAM) or Rambus DRAM (RDRAM), etc.), a static memory 597 (e.g., flash memory, static random access memory (SRAM), etc.), and a data storage system 598, which communicate with each other via a bus 596.

The processing device 591 represents one or more general-purpose processing devices such as a microprocessor, a central processing unit, or the like. More particularly, the processing device 591 can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 591 can also be one or more special-purpose processing devices such as an application specific integrated circuit (ASIC), a field programmable gate array (FPGA), a digital signal processor (DSP), network processor, or the like. The processing device 591 is configured to execute instructions 592 for performing the operations and steps discussed herein. The computer system 590 can further include a network interface device 594 to communicate over the network 595.

The data storage system 598 can include a machine-readable storage medium 599 (also known as a computer-readable medium) on which is stored one or more sets of instructions 592 or software embodying any one or more of the methodologies or functions described herein. The instructions 592 can also reside, completely or at least partially, within the main memory 593 and/or within the processing device 591 during execution thereof by the computer system 590, the main memory 593 and the processing device 591 also constituting machine-readable storage media. The machine-readable storage medium 599, data storage system 598, and/or main memory 593 can correspond to the memory sub-systems 111-1, 111-2, 111-N of FIG. 1.

In one embodiment, the instructions 592 include instructions to implement functionality corresponding to mirroring data to a virtual environment (e.g., using processors 104-1, 104-2, 104-N of FIG. 1). While the machine-readable storage medium 599 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a plurality of semiconductor devices each deployed in a respective area that includes a respective sensor, wherein each of the plurality of semiconductor devices comprise:

a respective local memory; and a respective local processor coupled to the respective local memory, wherein the respective local processors of the plurality of semiconductor devices are configured to:

train a global operation model by federated learning to generate an inference about an environment around a particular semiconductor device; and update the global operation model by federated learning based on:

respective test data generated by each of the plurality of semiconductor devices from execution of a golden model, which has a known output for a given input, using the given input;

respective operating data from each of the plurality of semiconductor devices; and respective sensor data from the respective sensors; and a central server coupled to the plurality of semiconductor devices via a wireless network or a physical network, wherein the central server comprises:

a memory; and a processor coupled to the memory, wherein the processor is configured to:

store the global operation model in the memory;

receive different test data and different operating data from a different semiconductor device based on operation of the different semiconductor device in a different area;

run the global operation model on the different test data and different operating data to generate an inference about an environment around the different semiconductor device; and classify the area around the different semiconductor device as hazardous or non-hazardous based on the inference.

2. The system of claim 1, further comprising the different semiconductor device without a sensor.

3. The system of claim 2, wherein the different semiconductor device is configured to record a threshold voltage, cell current, and/or operating temperature during an execution of the golden model.

4. The system of claim 3, wherein the threshold voltage, cell current, and/or operating temperature is the different operating data.

5. The system of claim 1, wherein the global operation model generates output data including an ambient temperature and/or particle saturation at the area around the different semiconductor device.

6. The system of claim 5, wherein the processor is configured to classify the area around the different semiconductor device as hazardous or non-hazardous based on the ambient temperature and/or the particle saturation.

7. The system of claim 1, wherein the different semiconductor device is a memory device.

8. A method comprising:

deploying each of a plurality of semiconductor devices in a respective area that includes a respective sensor;

training a global operation model by federated learning via the plurality of semiconductor devices to generate an inference about an environment around a particular semiconductor device;

updating the global operation model by federated learning via the plurality of semiconductor devices based on:

respective test data generated by each of the plurality of semiconductor devices from execution of a golden model, which has a known output for a given input, using the given input;

respective operating data from each of the plurality of semiconductor devices; and respective sensor data from the respective sensors;

storing the global operation model in memory of a central server coupled to the plurality of semiconductor devices via a wireless network or a physical network;

receiving different test data and different operating data at the central server from a different semiconductor device based on operation of the different semiconductor device in a different area;

running the global operation model on the different test data and different operating data at the central server to generate an inference about an environment around the different semiconductor device; and classifying the area around the different semiconductor device as hazardous or non-hazardous based on the inference at the central server.

9. The method of claim 8, further comprising recording the respective sensor data at the respective sensors.

10. The method of claim 9, further comprising recording the respective sensor data using at least one temperature sensor.

11. The method of claim 9, further comprising storing the classification of the area around the different semiconductor device in a database of the central server.

12. The method of claim 9, further comprising recording the respective sensor data using at least one alpha particle sensor.

13. The method of claim 9, further comprising classifying the area around the different semiconductor device as hazardous in response to output data generated by the global operation model including a radiation level at or above a threshold radiation level or non-hazardous in response to the output data generated by the global operation model including the radiation level below the threshold radiation level.

* * * * *